United States Patent Office 3,386,910
Patented June 4, 1968

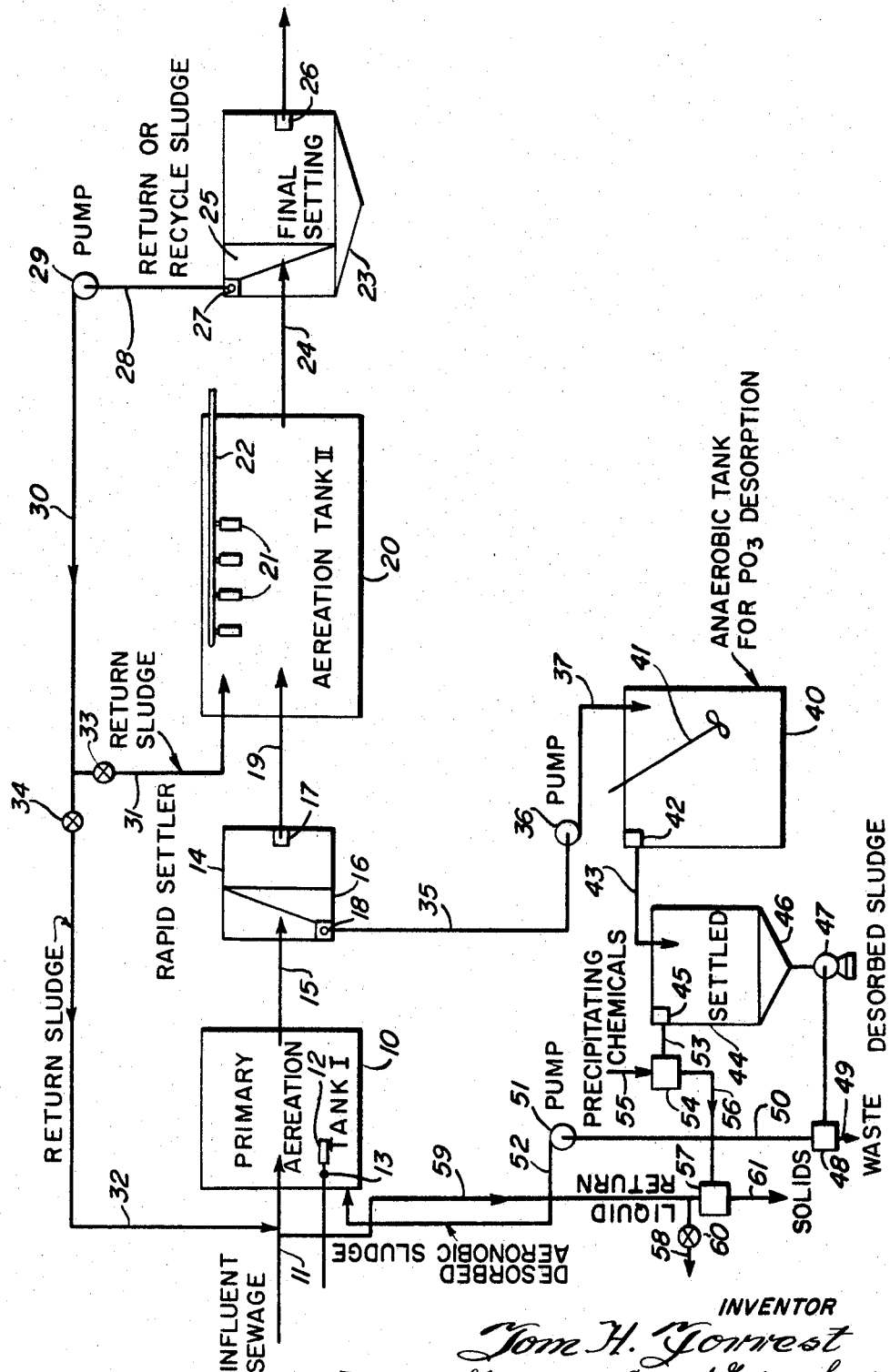

3,386,910
PROCESS FOR TREATMENT OF SEWAGE AND NUTRIENT REMOVAL
Tom H. Forrest, Evanston, Ill., assignor to FMC Corporation, a corporation of Delaware
Filed May 25, 1965, Ser. No. 458,689
6 Claims. (Cl. 210—5)

ABSTRACT OF THE DISCLOSURE

The process of this invention deals with the treatment of sewage to produce an effluent having a low biochemical oxygen demand and a markedly reduced content of nutrients, such as phosphorus compounds. In the illustrative embodiment, sewage is subjected to two stages of aeration and settling. Sludge recovered by settling the mixed liquor of the first aeration stage is either discharged to waste, or if needed for recycle is treated to remove its phosphate content. Sludge recovered by settling the mixed liquor of the second aeration stage is a low phosphate content sludge and is used for seeding the aeration stages.

---

This invention relates to a process for treatment of sewage. More particularly, it relates to an activated sludge type process which produces an effluent substantially free of phosphorus and phosphorus-containing compounds. Still more particularly, it relates to an activated sludge type process which avoids establishment of equilibrium conditions for soluble minerals and involves recycling of a sludge substantially free of phosphorus compounds.

In accordance with this invention, a method of treating sludge is provided wherein the first aeration stage of a two stage aeration system produces a phosphorus rich sludge and the second aeration stage operates to insure a high biochemical oxygen demand (B.O.D.) reduction and to produce a substantially phosphorus free sludge which is satisfactory for recycle to either aeration stage without reintroducing any appreciable quantities of phosphorus into the mixed liquors.

In the conventional activated sludge systems in use today, the sewage is subjected to the usual screening, degritting, etc., operations following which the sewage is mixed with material recycled from a settling tank and subjected to aeration. The amonut of recycled sludge constitutes a volume of from about 25% to 200%, based upon the volume of incoming sewage having a B.O.D. in the range between about 20 p.p.m. and 400 p.p.m.

This type of treatment, with continuous recycle of large volumes of sludge containing liquids, creates a condition whereby equilibriums are established at relatively high levels of concentration for dissolved mineral elements such as phosphorus. Discharge of effluent daily from systems having a high mineral content, into receiving bodies, leads eventually to contamination of these bodies with the consequent results of promoting undesirable blooms, generating obnoxious odors, etc.

Most frequently, conventional activated sludge systems of sewage treatment discharge more dissolved phosphorus than the average content of raw sewage because equilibrium conditions are established favorable to accumulation in the liquid, as dissolved phosphorus, more than that which enters the system normally as organic mineral.

Heretofore, the accumulation of equilibrium amounts of phosphorus in the liquid of activated sludge systems has been recognized, but since emphasis was on B.O.D. removal, a high phosphorus content in the effluent was accepted as a necessary disadvantage. Consequently, steps were taken, only when serious conditions arose, such as periodically purging the system by precipitating phosphates from the treated liquid using lime, ferric chloride, and like acting chemicals.

Now it has been discovered that phosphorus can be prevented from building up to equilibrium proportions by mixing the influent sewage with substantially phosphorus free recycle sludge, areating the mixture in a first aeration treatment stage under conditions of solids concentration and time to accomplish only partial removal of B.O.D. and limit the aeration period to a length of time avoiding appreciable desorption of phosphorus, separating this first produced sludge from the mixed liquor in a fast separation operation conducted under substantially areobic conditions, the maximum time for residence of sludge in the settler being limited to about 30 minutes, discharging a phosphorus rich sludge to waste or to a point for suitable subsequent processing, discharging the overflow from the first separation operation to a second aeration stage where B.O.D. removal is completed in a substantially phosphorus free environment, discharging a mixed liquor from the second aeration stage to a second separation stage, separating a substantially phosphorus free effluent for discharge to a receiving body of liquid and a substantially phosphorus free sludge for recycle to either or both of the aeration stages.

More in detail, in one mode of operation, the process of treating sewage comprises mixing raw sewage, the insoluble solids of which preferably are in a comminuted form, with a substantially phosphorus free recycle sludge and aerating the mixture. In order to avoid a length of time in this first aeration stage which would permit accumulation of water-soluble compounds of phosphorus in the aqueous media, the first aeration operation is of limited duration which generally can be limited to that time required for a B.O.D. removal in the range between about 45% and 65%. Sewage is introduced into the first aeration stage generally in metered amounts. The mixed liquor is subjected to aeration on a continuous or intermittent basis, preferably a continuous basis. B.O.D. loading of the first aeration stage of generally limited loadings in the range between about 50 and 300 pounds of B.O.D. per 1000 cubic feet of aeration volume although the loadings under some specific conditions can be higher.

The solids concentration to be maintained in this first stage of aeration generally is in the range between about 500 and 5000 p.p.m. The amount of solids can be varied or correlated with the time of treatment which is in the range of about one hour to two hours. A wide range in solids concentration is needed, even though an average value for operation based on design values may be in the range of 1000 p.p.m. to 2000 p.p.m., because of the wide variation in flow of incoming sewage received into the first aeration tank on an hourly basis, and because removal of phosphates is dependent on adequate treatment resulting from solids-liquid contact. As flow increases, average retention time of oxidizable material in the first aeration tank is reduced, which may be compensated for by increasing the solids concentration in the first aeration tank. Contrawise as flow decreases, retention time in the first aeration tank is longer, and to compensate, the solids concentration may be reduced. Consequently, inasmuch as the first stage of aeration is to be operated for maximum phosphorus removal, a combination of flow measuring devices with solids measuring devices is utilized to maintain control of the solids concentration and to maintain an optimum level of solids relative to the time that the liquid would be under aeration in the first aeration stage as determined by the throughput rate.

Following the first aeration operation, a mixed liquor containing a phosphorus rich sludge is discharged to a high rate separator. This transfer may be on a periodic or a continuous basis. The high rate separator operations are conducted strictly on the basis of accumulating a maximum amount of sludge in a minimum amount of time and limiting the residence time of the sludge in the separator. The remainder of the material in the separator which consists of aqueous medium and unsettled solids is discharged over a weir or other equivalent means to the second aeration stage. This discharged liquid and solids being passed to the second aeration stage still contains 35% to 50% of the biological oxygen demand introduced into this system but is relatively free of phosphorus-containing material.

In order to be certain that this effluent is substantially phosphorus free, the minimum time in the separator for sludge must be maintained at the minimum practical, usually a time not to exceed about 30 minutes. When sludge is separated from the mixed liquor and solids discharged from the first aeration zone in less than 30 minutes, desorption of phosphorus from the sludge is minimized. Separation as soon as appropriate solids concentration are attained in the separator may be accomplished by appropriate means such as airlifts operating in various types in hopper bottoms, and the like.

Phosphorus rich sludge recovered in this first separation operation may be disposed of as waste sludge or may be processed to recover a phosphorus free sludge, as will be described subsequently.

Liquor separated in the first settling operation is delivered to a second aeration stage where it is mixed with a substantially phosphorus free recycle sludge to produce a mixed liquor which is a substantially phosphorus free environment for the elimination of the still unsatisfied B.O.D. In the second aeration operation, it is desirable to maintain a solids concentration in the mixed liquor in the range between about 1000 p.p.m. and 4000 p.p.m.

Air is introduced into the second stage of aeration in quantities and for a time necessary to attain the substantially complete B.O.D. removal. In general, it is preferred to operate in this second aeration stage with B.O.D. loadings in the range between 50 and 150 pounds of B.O.D. per day per 1000 cubic feet of aerated volume. Since no desorption problems complicate the second aeration operation the time of treatment may be from 1½ hours to 4 hours.

Following treatment to remove substantially all of the B.O.D., mixed liquor is withdrawn continuously or intermittently. Separation of sludge in the final separator does not involve time relationships such as must be maintained in the separation stage intermediate the primary and secondary aeration operations. Nevertheless, the sludge accumulated should be kept in prime condition for recycle to the aeration stage. A minimum practical retention time is usually about 30 minutes and the maximum time for sludge to be retained in the separating stage is about three hours, unless precautions are taken such as agitation and aeration. The accumulated sludge concentrated to a solids concentration in the range of about 4000 to about 10,000 p.p.m. is recirculated to either or both aeration zones as required.

Control over the solids of both aeration tanks utilized in this system dictates the maintenance of a supply of substantially phosphorus free sludge which is adequate both for recycle and as a reserve supply to be drawn upon in times of high rate of flow of influent sewage. Under the conditions of split aeration, the second aeration being conducted in a substantially phosphorus free environment, the sludge from the second stage generally is sufficient to meet normally operating recycle requirements.

The total volume of the sludge being delivered to the mixing zone is usually between about 25% and 50% of the volume of the incoming sewage. In the event that the sludge produced in the second aeration stage is inadequate to provide the necessary amounts of phosphorus free sludge, the phosphorus rich sludge is delivered to a holding tank where the sludge is maintained in suspension by suitable agitation for a period generally of 3 to 6 hours. Sludge held in the holding tank for desorbing phosphate, generally should be starved for oxygen, at least periodically, so as to produce conditions favorable to desorption of phosphorus. However, sludge which it is desired to use as seed material preferably should not be held under anaerobic conditions for more than about four hours.

When agitating the contents of the holding tank in an anaerobic condition, the agitation must be of such a nature as to avoid sedimentation and preferably such as to ordinarily disintegrate sludge agglomerates. When the sludge is held for an appropriate period of at least one to two hours under anaerobic conditions, the solids of the system are reduced appreciably often as much as 50% and the phosphorus in the remaining solids is desorbed in appreciable quantities to produce a phosphorus rich liquid.

Contents of this holding or mixing tank are discharged continuously or intermittently to a settling tank for separation of a phosphorus rich liquor by decantation, flow over a weir or other suitable liquid solids separating operations. In the settling tank, the volume of phosphorus rich liquor produced constitutes between about 10% and 20% of the volume of incoming sewage. To avoid discharging a liquor with a high phosphorus content to a receiving stream, the phosphorus may be precipitated from the liquor by chemicals such as lime, ferrous chloride, etc., and the resultant liquid free of precipitated solids may be remixed with concentrated substantially phosphorus free sludge being recycled.

Desorbed sludge produced by the settling operation constitutes between about 15% and 30% of the volume of incoming sewage. This sludge may be discharged to waste or any desirable proportion thereof recycled to the first aeration stage of the process.

The invention will be further understood from the schematic flow sheet. Comminuted sewage enters primary aeration tank 10 through a conduit 11. Air is introduced into tank 10 by dispersers 12 supported by their communication piping with a header 13 which delivers air from a source under pressure not shown. Mixed liquor flows from tank 10 to a first separation tank 14 through conduit 15.

Separation tank 14 is provided with a sump 16 and an overflow weir 17. A pump 18 of the conventional airlift type is provided to withdraw settled sludge.

Liquor overflowing weir 17 is delivered to the second aeration tank 20 through a pipe 19. Air is introduced into tank 20 by dispersers 21 supported by their communication pipe with a header 22 which delivers air under pressure from a source not shown.

Mixed liquor is delivered from tank 20 to a second separation tank 23 through conduit 24. The second separation tank 23 is provided with a sump 25 and an overflow weir 26. A pump 27 of the conventional airlift type is provided to withdraw sludge from sump 25, although other equivalent means may also be used.

Sludge removed from tank 23 is delivered by a conduit 28, pump 29, pump discharge conduit 30, branch pipes 31 and 32 to aeration tank 20 and aeration tank 10, respectively. Flow in the branch pipes 31 and 32 are controlled by suitable valve means 33 and 34.

Sludge discharged from separation tank 14 is delivered by conduit 35, pump 36, and pump discharge conduit 37 to a mixing tank 40 provided with suitable agitator means 41. Sludge after a predetermined average residence time in tank 40 overflows a weir 42 and is delivered by conduit 43 into a settling tank 44.

Settling tank 44 is provided with an overflow weir 45 and sump 46. Sludge is removed from sump 46 by suitable means 47. Sludge removed from the sump 46 as by pump 47 is delivered to a stream splitter 48 where predetermined volumes of sludge can be directed to waste through conduit 49 or to recycle conduit 50 or any appropriate combination thereof.

Recycle conduit 50 is provided with suitable pumping means 51, the pump discharge conduit 52 of which delivers sludge to tank 10.

Liquid overflowing weir 45 is conducted by conduit 53 to a tank 54 where it is mixed with precipitating chemicals delivered through pipe 55 from a source not shown. Solids and liquor removed from tank 54 through pipe 56 are separated by suitable means 57, such as a filter and the liquid discharged to waste through pipe 58 or returned to the aeration tank 10, through conduit 59, the proportions being controlled by valve 60. A concentrate of precipitated material is discharged from separator means 57 through conduit 61 for disposal in any suitable manner.

When sewage is treated in accordance with this invention, effluent separated in the second separation tank will have a phosphate reduction of about 80% and a B.O.D. reduction of about 90%.

The above detailed description of this invention has been given by way of illustration without any intention that the invention be limited to the exact conditions set forth. No unnecessary limitations should be understood therefrom as modifications will be obvious to those skilled in the art.

I claim:

1. In a sewage treatment process adapted to produce a substantially phosphate free effluent for discharge to a receiving body of liquid, the steps comprising introducing sewage having an unsatisfied B.O.D. into a system having a sequential liquid flow arrangement of a first aeration zone, a sludge separation zone, a second aeration zone for treatment of liquor discharged from said sludge separation zone and a final separation zone where an effluent is separated for discharge to a receiving body and a substantially phosphate free sludge is recovered for recycle as a seeding material to be introduced into said aeration zones, said first aeration zone holding a mixed liquor formed of substantially phosphate free recycled sludge and untreated sewage which mixed liquor is aerated to remove between about 40% and 65% of the B.O.D., said sludge separation zone operating to discharge phosphate rich sludge from the system with a residence time for sludge limited to that under which aerobic conditions exist, said second aeration zone holding a second mixed liquor formed of substantially phosphate free recycle sludge and aqueous medium discharged from said first sludge separation zone which second mixed liquor is aerated for a time substantially to complete the B.O.D. removal, segregating a portion of the phosphate right sludge and liquid associated therewith removed from said sludge separation zone for conversion to a supplemental supply of phosphate free recycle sludge, agitating said segregated portion of phosphate rich sludge while it is held under anaerobic conditions for a period effecting phosphate desorption from the sludge into the liquid associated therewith, and separating the phosphate desorbed sludge as a substantially phosphate free sludge for return to said first aeration zone.

2. The process according to claim 1 wherein the mixed liquor in said first aeration zone has a solids concentration in the range between about 500 p.p.m. and about 5000 p.p.m., aeration time for the mixed liquor in said first aeration zone is a period in the range between about one hour and about two hours and the residence time of phosphate rich sludge in said sludge separation zone is a maximum of 30 minutes.

3. The process of treating sewage having an unsatisfied B.O.D. which comprises forming a first body of mixed liquor by mixing untreated sewage with substantially phosphate free seeding material in the form of recycled sludge, introducing air into said first body of mixed liquor for a period and in quantities effectuating removal of between about 40% and 65% of its B.O.D., withdrawing aerated mixed liquor from said first body to a first separation zone where the time for concentration is limited to that under which aerobic conditions exist, removing a phosphate rich sludge from said first separation zone, separately discharging an aqueous medium from said first separation zone, mixing discharged aqueous medium with substantially phosphate free seeding material in the form of sludge recycled from a second separation zone to form a second body of mixed liquor in a second aeration zone, introducing air into said second body of mixed liquor in quantities and for a time effectuating a substantially complete B.O.D. removal, discharging aerated aqueous liquor from said second body of liquid to a second separation zone, separating an effluent in said second separation zone for discharge to a receiving body, recovering a substantially phosphate free sludge from said second separation zone for recycle as the seeding material in said aeration zones, segregating a portion of the phosphate rich sludge and liquid associated therewith removed from said sludge separation zone for conversion to a supplemental supply of phosphate free recycle sludge, agitating said segregated portion of phosphate rich sludge while it is held under anaerobic conditions for a period effecting phosphate desorption from the sludge into the liquid associated therewith, and separating the phosphate desorbed sludge as a substantially phosphate free sludge for return to said first aeration zone.

4. The process of treating sewage having an unsatisfied B.O.D. which comprises forming a first body of mixed liquor by mixing untreated sewage with substantially phosphate free seeding material in the form of sludge recycled from a second separation zone, introducing air into said first body of mixed liquor for a period and in quantities effectuating removal of between about 40% and 65% of its B.O.D., withdrawing aerated mixed liquor from the first body to a separation zone where the time for concentration is limited to that under which aerobic conditions exist, removing a phosphate rich sludge from said first separation zone, separately discharging an aqueous medium from said first separation zone, mixing discharged aqueous medium with substantially phosphate free seeding material in the form of sludge recycled from a second separation zone to form a second body of mixed liquor in a second aeration zone, introducing air into said second body of mixed liquor in quantities and for a time effectuating a substantially complete B.O.D. removal, discharging the aerated aqueous liquor from the second body of liquid to the second separation zone, separating an effluent in said second separation zone for discharge to a receiving body, recovering a substantially phosphate free sludge from said second separation zone for recycle as the seeding material in said aeration zones, discharging a sludge concentrate from said first separation zone to a mixing zone where the liquid contents are maintained in an agitated condition and under anaerobic conditions whereby phosphates are desorbed from said sludge solids, continuously withdrawing a portion of said anaerobically treated material from said mixing zone to a settling zone, segregating a desorbed sludge in said settling zone, discharging a phosphate rich effluent from said settling zone, withdrawing a concentrate of substantially phosphate free settled solids from said settling zone and recycling at least a portion of said desorbed sludge to said first aeration zone.

5. The process of treating sewage having an unsatisfied B.O.D. which comprises forming a first body of mixed liquor by mixing untreated sewage with substantially phosphate free seeding material in the form of sludge recycled from a second separation zone, introducing air into said first body of mixed liquor for a period and in quantities effectuating removal of between about 40% and 65% of its B.O.D., withdrawing aerated mixed liquor from the first body to a separation zone where the time for concentration is limited to that under which aerobic conditions exist, removing a phosphate rich sludge from said first separation zone, separately discharging an aqueous medium from said first separation zone, mixing discharged aqueous medium with substantially phosphate free seeding material in the form of sludge from a second separation zone to form a second body of mixed liquor in a second aeration zone, introducing air into said second body of mixed liquor in quantities and for a time effectuating a substantially complete B.O.D. removal, discharging the aerated aqueous liquor from the second body of liquid to the second separation zone, separating an effluent in said second separation zone for discharge to a receiving body, recovering a substantially phosphate free sludge from said second separation zone for recycle as the seeding material in said aeration zones, discharging a sludge concentrate from said first separation zone to a mixing zone where the liquid contents are maintained in an agitated condition and under anaerobic conditions for a period in the range between about three hours and about six hours whereby phosphates are desorbed from said sludge solids, withdrawing anaerobically treated material from said mixing zone to a settling zone, segregating a desorbed sludge in said settling zone, discharging a phosphate rich effluent from said settling zone, withdrawing a concentrate of substantially phosphate free settled solids from said settling zone and recycling at least a portion of said desorbed sludge to said first aeration zone.

6. The process of treating sewage having an unsatisfied B.O.D. which comprises forming a first body of mixed liquor by mixing untreated sewage with substantially phosphate free seeding material in the form of sludge recycled from a second separation zone, introducing air into said first body of mixed liquor for a period and in quantities effectuating removal of between about 40% and 65% of its B.O.D., withdrawing aerated mixed liquor from the first body to a separation zone where the time for concentration is limited to that under which aerobic conditions exist, removing a phosphate rich sludge from said first separation zone, separately discharging an aqueous medium from said first separation zone, mixing discharged aqueous medium with substantially phosphate free seeding material in the form of sludge from a second separation zone to form a second body of mixed liquor in a second aeration zone, introducing air into said second body of mixed liquor in quantities and for a time effectuating a substantially complete B.O.D. removal, discharging the aerated aqueous liquor from the second body of liquid to the second separation zone, separating an effluent in said second separation zone for discharge to a receiving body, recovering a substantially phosphate free sludge from said second separation zone for recycle as the seeding material in said aeration zones, discharging a sludge concentrate from said first separation zone to a mixing zone where the liquid contents are maintained in an agitated condition and under anaerobic conditions for a period in the range between about three hours and about six hours whereby phosphate is desorbed from said sludge solids, withdrawing an anaerobically treated material from said mixing zone to a settling zone, segregating a desorbed sludge in said settling zone, discharging a phosphate rich effluent from said settling zone, withdrawing a concentrate of substantially phosphate free settled solids from said settling zone and recycling sufficient desorbed sludge to maintain the total volume of desorbed sludge plus sludge from said second separation zone to said first aeration zone, in the range between about 25% and 50% of the volume of incoming sewage.

References Cited

UNITED STATES PATENTS

| | | | |
|---|---|---|---|
| 3,235,487 | 2/1966 | Westgarth | 210—6 |
| 3,236,766 | 2/1966 | Levin | 210—6 |

OTHER REFERENCES

Imhoff, K., et al.: Sewage Treatment, second edition, 1956, John Wiley and Sons, New York, p. 155.

Torpey, W. N., et al.: Principles of Activated Sludge Operation, article appearing in Biological Treatment of Sewage and Industrial Wastes, vol. 1, Aerobic Oxidation, edited by McCabe et al., 1956, Reinhold Publishing Co., New York, pp. 293–299.

Feng, T. H.: Phosphorus and the Activated Sludge Process, Water and Sewage Works, November 1962, vol. 109, pp. 431–436.

MICHAEL E. ROGERS, *Primary Examiner.*